United States Patent
Izumi et al.

(10) Patent No.: US 9,329,593 B2
(45) Date of Patent: May 3, 2016

(54) ROBOT SYSTEM, METHOD FOR CONTROLLING ROBOT, AND METHOD FOR PRODUCING TO-BE-PROCESSED MATERIAL

(71) Applicant: KABUSHIKI KAISHA YASKAWA DENKI, Kitakyushu-shi (JP)

(72) Inventors: Tetsuro Izumi, Kitakyushu (JP); Tamio Nakamura, Kitakyushu (JP); Dai Kouno, Kitakyushu (JP); Ryoichi Nagai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/191,432

(22) Filed: Feb. 27, 2014

(65) Prior Publication Data
US 2014/0277714 A1  Sep. 18, 2014

(30) Foreign Application Priority Data
Mar. 15, 2013  (JP) .................. 2013-053305

(51) Int. Cl.
*G05B 19/418* (2006.01)
*B25J 9/16* (2006.01)
(Continued)

(52) U.S. Cl.
CPC ......... *G05B 19/41815* (2013.01); *B25J 9/0084* (2013.01); *B25J 9/1682* (2013.01);
(Continued)

(58) Field of Classification Search
CPC ........ B25J 9/1682; B25J 21/00; B25J 9/0084; G05B 19/41815; G05B 2219/34399; G05B 2219/39109; G05B 2219/39139; G05B 2219/40301; G05B 2219/49141; G05B 2219/19135; G05B 2219/39135; G05B 2219/40307
IPC ............. B25J 9/0084, 9/1682; G05B 19/41815, G05B 2219/34399, 2219/39109, 2219/39135, G05B 2219/39139, 2219/40301, 2219/40307, G05B 2219/49141, 2219/19135
See application file for complete search history.

(56) References Cited

U.S. PATENT DOCUMENTS

| 5,254,923 | A | 10/1993 | Kanitani |
| 5,438,647 | A | 8/1995 | Nagamatsu et al. |

(Continued)

FOREIGN PATENT DOCUMENTS

| EP | 0704780 A1 | 4/1996 |
| EP | 704780 B1 * | 1/2002 |
| JP | 2009-262310 | 11/2009 |

OTHER PUBLICATIONS

Extended European Search Report for corresponding EP Application No. 14157609.0-1807, Jun. 24, 2015.
(Continued)

*Primary Examiner* — Khoi Tran
*Assistant Examiner* — Robert Nguyen
(74) *Attorney, Agent, or Firm* — Mori & Ward, LLP

(57) ABSTRACT

A robot system includes a plurality of robots, a plurality of cells, a detection device, and a changer device. Each of the plurality of robots is configured to operate based on an operation command. The plurality of cells respectively accommodate the plurality of robots and are connectable to each other. The detection device is configured to detect that the plurality of cells are connected to each other. When the detection device detects that the plurality of cells are connected to each other, the changer device is configured to change at least one operation command among operation commands for the plurality of robots respectively accommodated in the connected cells.

16 Claims, 6 Drawing Sheets

(51) Int. Cl.
*B25J 9/00* (2006.01)
*B25J 21/00* (2006.01)

(52) U.S. Cl.
CPC ...... *B25J 21/00* (2013.01); *G05B 2219/39109* (2013.01); *G05B 2219/39135* (2013.01); *G05B 2219/40307* (2013.01)

(56) References Cited

U.S. PATENT DOCUMENTS

| | | | | |
|---|---|---|---|---|
| 6,330,493 | B1* | 12/2001 | Takahashi | B25J 9/1682 700/245 |
| 2005/0036879 | A1 | 2/2005 | Jhaveri et al. | |
| 2005/0055132 | A1* | 3/2005 | Matsumoto | B25J 9/1682 700/245 |
| 2007/0150093 | A1 | 6/2007 | Nagatsuka et al. | |
| 2008/0234861 | A1* | 9/2008 | Fortell | B25J 9/1682 700/245 |

OTHER PUBLICATIONS

Chinese Office Action for corresponding CN Application No. 201410042310.X, Jun. 18, 2015.

Chinese Office Action for corresponding CN Application No. 201410042310.X, Feb. 29, 2016.

* cited by examiner

ROBOT SYSTEM, METHOD FOR CONTROLLING ROBOT, AND METHOD FOR PRODUCING TO-BE-PROCESSED MATERIAL

CROSS-REFERENCE TO RELATED APPLICATIONS

The present application claims priority under 35 U.S.C. §119 to Japanese Patent Application No. 2013-053305, filed Mar. 15, 2013. The contents of this application are incorporated herein by reference in their entirety.

BACKGROUND

1. Field of the Invention

The present invention relates to a robot system, a method for controlling a robot, and a method for producing a to-be-processed material.

2. Discussion of the Background

Japanese Unexamined Patent Application Publication No. 2009-262310 discloses that a plurality of box-shaped cells each accommodating a robot are prepared and connected together into a desired production line.

SUMMARY

According to one aspect of the present disclosure, a robot system includes a plurality of robots, a plurality of cells, a detection device, and a changer device. Each of the plurality of robots is configured to operate based on an operation command. The plurality of cells respectively accommodate the plurality of robots and are connectable to each other. The detection device is configured to detect that the plurality of cells are connected to each other. When the detection device detects that the plurality of cells are connected to each other, the changer device is configured to change at least one operation command among operation commands for the plurality of robots respectively accommodated in the connected cells.

According to another aspect of the present disclosure, a method for controlling a robot includes detecting connection between a plurality of cells respectively corresponding to a plurality of robots each configured to operate based on an operation command. When the connection between the plurality of cells is detected in the detecting step, at least one operation command among operation commands for the plurality of robots respectively accommodated in the connected cells is changed.

According to the other aspect of the present disclosure, a method for producing a to-be-processed material includes supplying to-be-processed materials each to a corresponding one cell among a plurality of cells respectively corresponding to a plurality of robots each configured to operate based on an operation command. Connection between the plurality of cells is detected. When the connection between the plurality of cells is detected in the detecting step, at least one operation command among operation commands for the plurality of robots respectively accommodated in the connected cells is changed. The to-be-processed materials done with work performed by the plurality of robots are taken out from the cells accommodating the to-be-processed materials.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
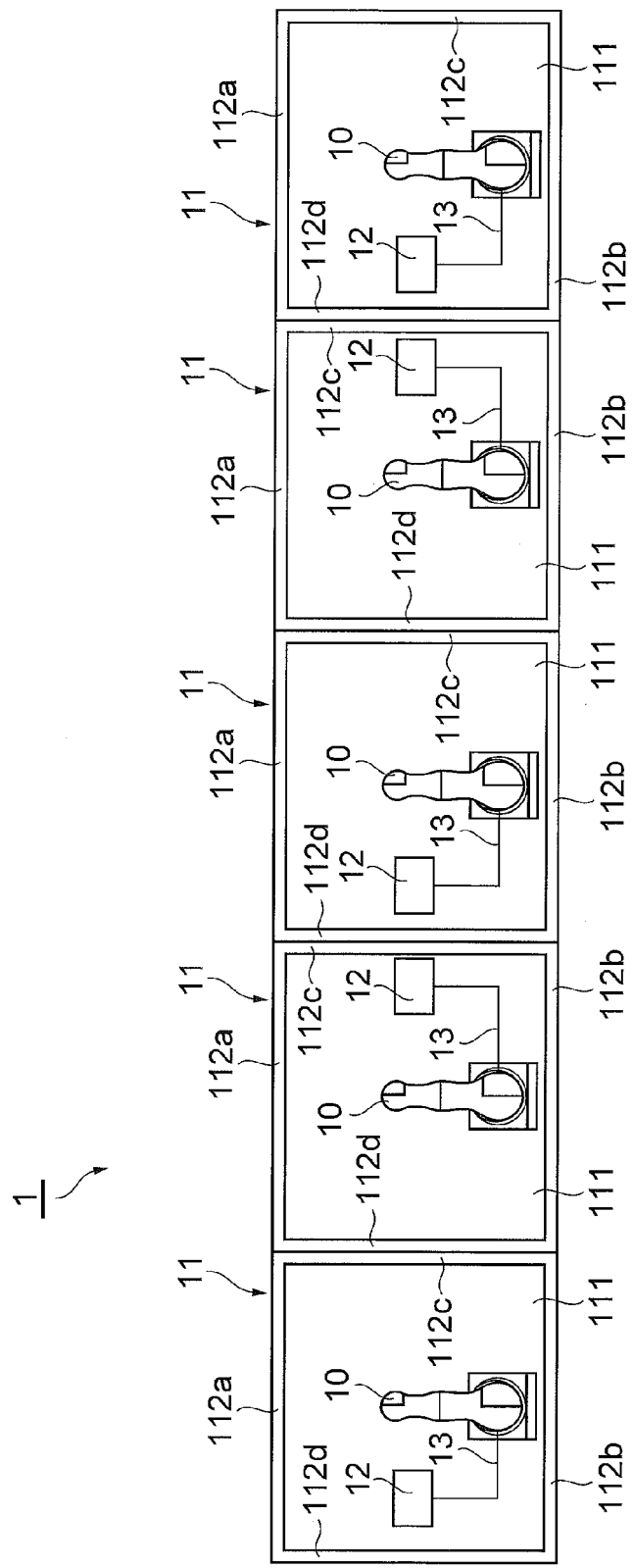
FIG. 1 is a plan view of a robot system according to an embodiment.

The embodiments will now be described with reference to the accompanying drawings, wherein like reference numerals designate corresponding or identical elements throughout the various drawings.

In a robot system according to an embodiment, the robots accommodated the cells perform various kinds of work such as processing and assembly on a workpiece (to-be-worked materials). The workpiece may be a single part, or a product or a semi-processed product formed of a combination of a plurality of parts. The robot system is used for what is called a cell production system. The cells accommodating the robots are densely arranged in the robot system according to this embodiment. This improves the productivity of the workpieces W. The workpiece may be any kind of item subject to work such as conveyance and assembly in the robot system. Examples of the to-be-processed material include, but are not limited to, parts such as bolts, substrate assemblies for electronic use, automobiles, and processed food.

FIG. 1 is a plan view of a robot system 1 according to this embodiment. As shown in FIG. 1, the robot system 1 according to this embodiment includes a plurality of robots 10 and a plurality of cells 11. The robots 10 perform various kinds of work on a workpiece. The cells 11 each accommodate corresponding one of the robots 10. Each cell 11 further accommodates a cable harness 13 to couple the robot 10 to a controller 12 in a mutually communicable manner. The robot 10 and the controller 12 may be coupled to each other wirelessly, or the controller 12 may be built in the robot 10.

The cell 11 includes a rectangular mount 111 and outer walls 112a, 112b, 112c, and 112d. The mount 111 serves as a bottom surface to support the robot 10. The outer walls 112a, 112b, 112c, and 112d are each disposed on a corresponding one of the sides of the mount 111. The robot 10 is accommodated in the area of space defined by the mount 111 and the outer walls 112a, 112b, 112c, and 112d. The cells 11 are connectable to each other. Two adjacent cells 11 are connected to each other with the outer wall 112c of one cell 11 physically connected to the outer wall 112d of the other cell 11.

Figure 2:
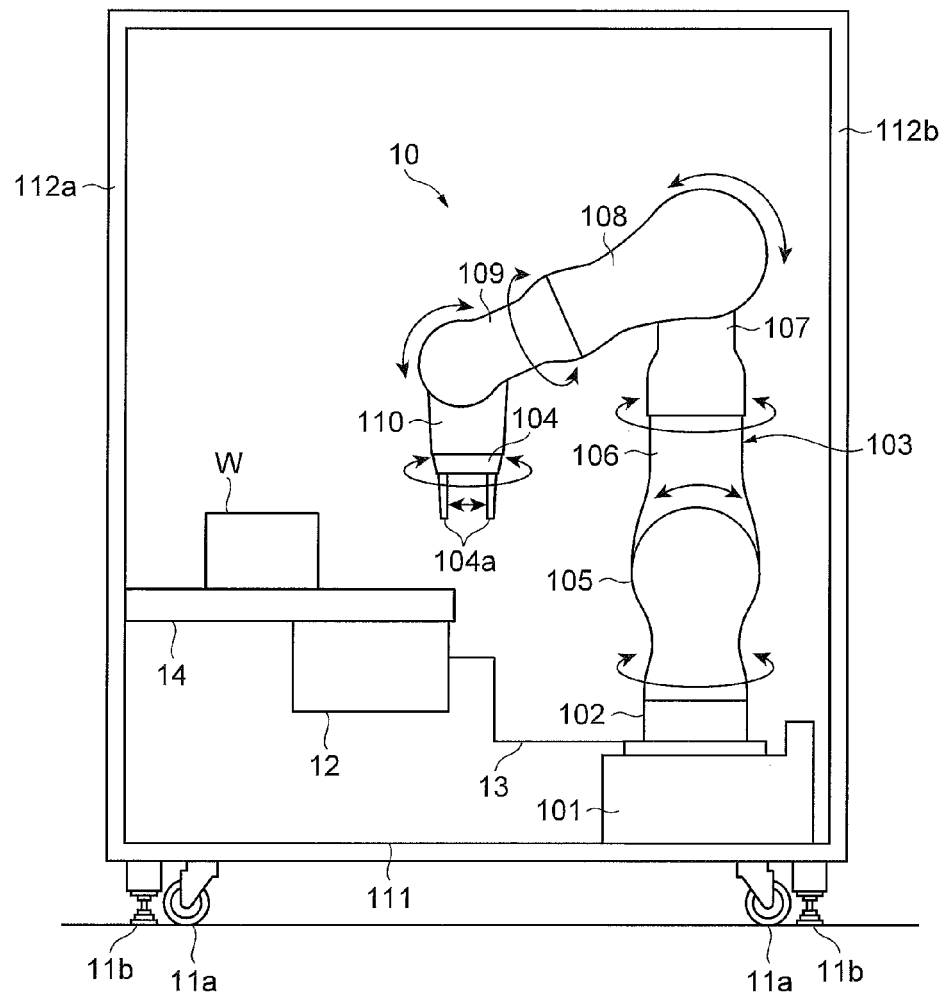
FIG. 2 is a side view of a cell included in the robot system shown in FIG. 1.

Next, an internal configuration of the cell 11 will be described in detail by referring to FIG. 2. FIG. 2 is a side view of a cell included in the robot system shown in FIG. 1. As shown in FIG. 2, the cell 11 accommodates a workpiece W as a to-be-worked material, in addition to the robot 10 and the controller 12. The workpiece W is placed on a work table 14. The controller 12 is disposed under the work table 14. The side wall 112a on the front side of the cell 11 is where the following operation parts, not shown, are collectively disposed: an opening through which the workpiece W is supplied and taken out; a monitor on which to check the work status of the robot; and various gauges and switches. This ensures that the operator only needs to be positioned on the front side of the cell 11 when operating the robot system 1. Each of the outer walls 112a to 112d of the cell 11 has a window (not shown) on a part of each outer wall. The window is made of polycarbonate superior in transparency and impact resistance, and thus enables the operator to check the work status through the window. The cell 11 includes casters 111a and stoppers 111b on the lower surface of the mount 111. The casters 111a and the stoppers 111b facilitate the movement and fixation of the cell 11.

The robot 10 includes a base 102, a robot arm 103, and a hand 104 as an end effector. The base 102 is mounted to a base 101 secured on the mount 111. The robot arm 103 extends upward from the base 102. The hand 104 is mounted to the distal end of the robot arm 103. The robot 10 operates based on an operation command from the controller 12. The operation command is a command as a program to activate the robot or a combination job of programs to activate the robot.

The robot arm 103 is made up of first to sixth arms 105 to 110 coupled to each other, in the order from the base end (base 102) side to the distal end (hand 104) side. Each of these arms accommodates an actuator to drive the arm into rotation as indicated by the two-headed arrows shown in FIG. 2 at joints where the arms are coupled to each other.

The sixth arm 110, which is at the distal end of the robot arm 103, incorporates an actuator to drive the hand 104 into rotation. The hand 104 incorporates an actuator to drive a pair of holding claws 104a mounted to the distal end of the hand 104.

Under the control of the controller 12, the robot 10 operates the first to the sixth arms 105 to 110, the hand 104, and the holding claws 104a to perform work such as processing and assembly on the workpiece W.

Figure 3:
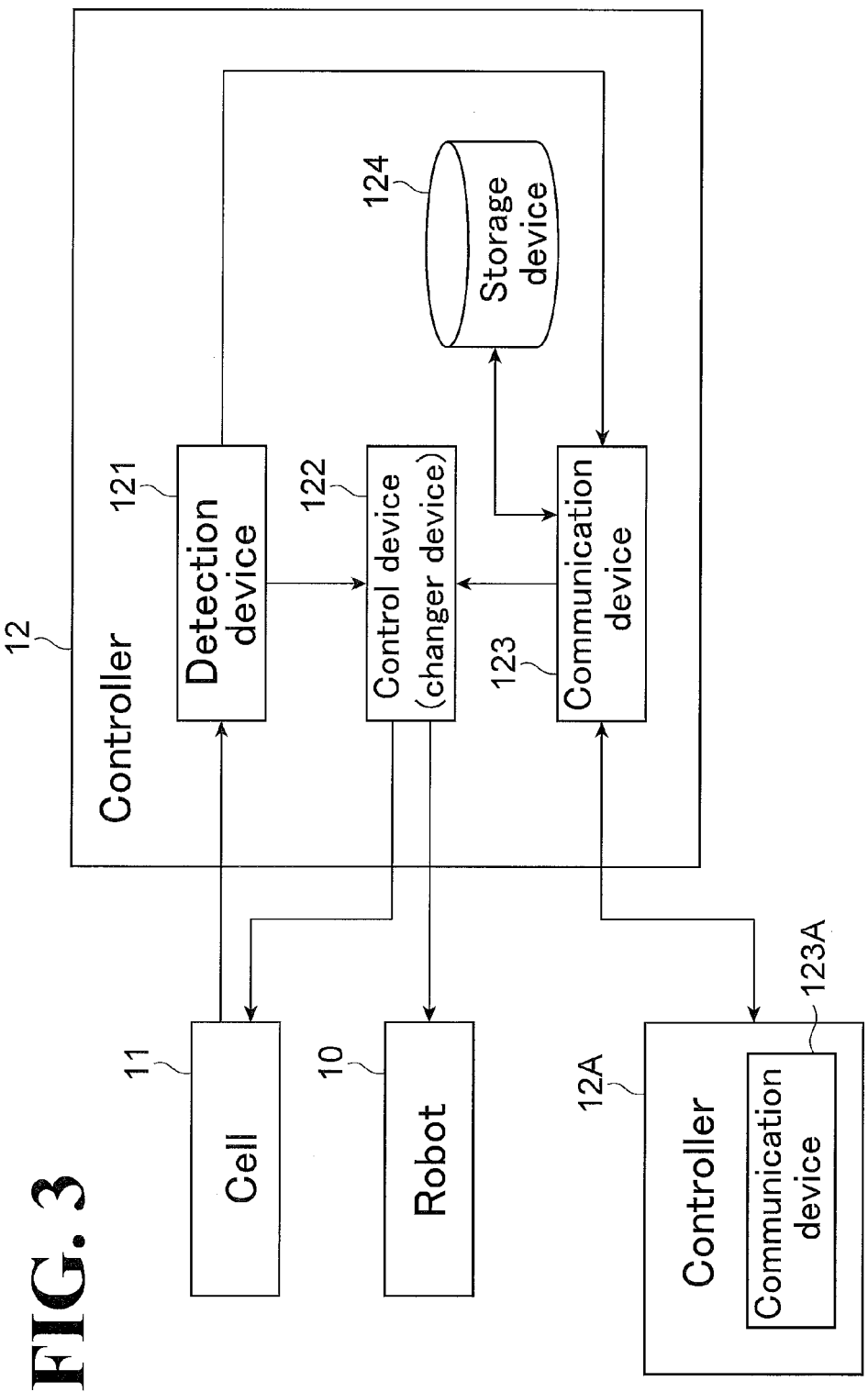
FIG. 3 is a diagram illustrating functional blocks of a controller.

An example of the controller 12 is a computer including an arithmetic operation device, a storage device, and an input-output device. Functions of the controller 12 will be described by referring to FIG. 3. FIG. 3 is a diagram illustrating functional blocks of the controller 12. As shown in FIG. 3, the controller 12 includes a detection device 121, a control device (changer device) 122, a communication device 123, and a storage device 124.

The detection device 121 detects that the plurality of cells 11 are connected to each other. Specifically, the detection device 121 detects that the cells 11 are connected to each other based on information received from connection sensors (not shown) disposed on the outer walls 112c and 112d of the cells 11. The connection sensor may be any sensor capable of detecting that the outer walls 112c and 112d of the respective cells 11 different from each other are connected (come into contact) to each other. Examples of the connection sensor include, but are not limited to, a sensor to detect pressure at the time of the contact, a sensor to detect an electrical change caused by the contact, and a sensor to detect a temperature change caused by the contact. The connection sensor is able to identify the connected cell 11. The cell 11 and the controller 12 are connected to each other through a cable harness (not shown) so as to ensure that information (including information indicating the connected cells 11) indicating connection of the cells 11 is input to the detection device 121 from the connection sensor. The cell 11 may be coupled to the controller 12 wirelessly. The information indicating connection of the cells 11 detected by the detector 121 is input into the control device 122 and the communication device 123.

The control device 122 generates an operation command to control the operation of the robot 10. Specifically, the control device 122 is coupled to the actuators of the robot 10 through the cable harness 13, and uses the operation command to drive the actuators, thereby controlling the operation of the robot 10. The control device 122 controls the operation of the cell 11 based on the information indicating connection of the cells 11 received from the detection device 121. Upon receiving the information from the detection device 121, the control device 122 opens one of the outer walls 112c and 112d of the cell 11 that is connected to another cell 11. By opening the connected side wall 112c or 112d of one connected cell 11 (among the connected cells 11), the work area of the one connected cell 11 is available for use by the robot 10 accommodated in the other connected cell 11. That is, the work area of the robot 10 is widened. In the following description, the other cell 11 connected to the one cell 11 will be occasionally referred to as a cell 11A; the robot 10 accommodated in the cell 11A will be occasionally referred to as a robot 10A; and the controller 12 accommodated in the cell 11A is occasionally referred to as a controller 12A.

Based on the information indicating connection of the cells 11 (including information indicating the connected cell 11A) received from the detection device 121, the communication device 123 communicates with the communication device 123A of the controller 12A, which is accommodated in the connected cell 11A. The communication device 123 (controller 12) and the communication device 123A (controller 12A) may communicate with each other wirelessly or through a cable harness (not shown) that couples the controller 12 and the controller 12A to each other. It is possible to provide a programmable logic controller (PLC) (not shown) as an upper device common to the controllers 12 and 12A to centralize the control of input and output signals to and from the controllers 12 and 12A.

The communication between the communication devices 123 and 123A will be described. Based on information received from the detection device 121, the communication device 123 reads information related to each job of the robot 10 from the storage device 124. The storage device 124 stores one job or a plurality of jobs of the robot 10 determined in accordance with the cell (cell 11A, for example) connected to the cell 11. The information related to each job includes work area information and time information. The area information and the time information are stored on a single job basis. The work area information is information on an area in which the robot 10 works. The work area information includes information on an own cell work area, which is the work area within the cell 11 accommodating the robot 10, and information on the other cell work area, which is the work area within the cell 11A connected to the cell 11. The time information is information indicating the start time of each job (the time required for the robot 10 to start the job after the other cell 11A has been connected to the cell 11), and the time that each job takes.

The information on each job of the robot 10 read from the storage device 124 is notified (transmitted) from the communication device 123 to the communication device 123A of the controller 12A accommodated in the connected cell 11A. The communication device 123 may notify the communication device 123A of the information on each job of the robot 10 only when the work area information, which is the information on each job of the robot 10, includes information on the other work area as the work area within the cell 11A connected to the cell 11, that is, when the robot 10 is to work in the connected cell 11A. The communication device 123 also inputs the information on each job of the robot 10 into the control device 122.

Upon receiving the notification from the communication device 123, the communication device 123A reads information on each job of the robot 10A accommodated in the cell 11A from a storage device (not shown). The communication device 123A determines whether the robot 10 and the robot 10A will interfere with each other in the cell 11A based on the received work area information and the received time information of the robot 10 and based on the work area information and the time information of the robot 10A read from the storage device. The communication device 123A notifies the communication device 123 of information on whether an interference will occur and the information on each job of the robot 10A.

Upon receiving the notification from the communication device 123A, the communication device 123 inputs the information on whether the interference will occur and the information on each job of the robot 10A into the control device 122.

The control device 122 serves as a changer device. When the detection device 121 detects that the cells 11 and 11A are connected to each other, the changer device changes at least one operation command among the operation commands for the robots 10A and 10A respectively accommodated in the plurality of connected cells 11 and 11A. Specifically, the control device 122 changes the at least one operation command for the robot 10A in response to the detection of the connection between the cells 11 and 11A by the detection device 121, based on the information on each job of the robot 10 and the robot 10A and the information on whether the interference will occur received from the communication device 123. When the robots 10 and 10A do not interfere with each other in the cell 11A, the control device 122 controls the robot 10 to operate normally. Specifically, the control device 122 controls the robot 10 in accordance with the information on each job of the robot 10.

When the robots 10 and 10A will interfere with each other in the cell 11A if the robot 10 operates normally, the control device 122 changes the operation command for the robot 10 to avoid the interference between the robots 10 and 10A. Specifically, the control device 122 suspends the job of the robot 10 until the job of the robot 10A is complete, so as to avoid the interference between the robots 10 and 10A. Upon elapse of a predetermined period of time, the control device 122 makes a communication resume request to the communication device 123 so as to resume the communication between the above-described communication devices 123 and 123A.

When it is possible to avoid the interference between the robots 10 and 10A by switching the order of interchangeable jobs, the control device 122 may switch the order of the interchangeable jobs and control the robot 10 to operate in the switched order. The control device 122 may not necessarily give priority to the job of the robot 10A; instead, the control device 122 may prioritize the robots 10 and 10A to determine which job to give priority. The control device 122 may set the suspended time (waiting time) of the job of the robot 10 by taking into consideration the complete time of the job of the robot 10A interfering with the robot 10. This eliminates making repetitive communication resume requests to the communication device 123. This, in turn, results in an operation program that eliminates an interference between the robots 10 and 10A while minimizing the number of times of real-time communication.

When the cells 11 and 11A are connected to each other, the control device 122 may change the operation command for the robot 10 to synchronize the operations of the robots 10 and 10A. Specifically, the control device 122 changes the operation command for the robot 10 to synchronize the operations of the robots 10 and 10A when the control device 122 determines, based on the information on each job of the robots 10 and 10A input from the communication device 123, that controlling the robots 10 and 10A to work synchronously makes their work efficient; for example, when the control device 122 determines that the workpieces W could be more readily conveyed if the robots 10 and 10A operate synchronously.

Figure 4:
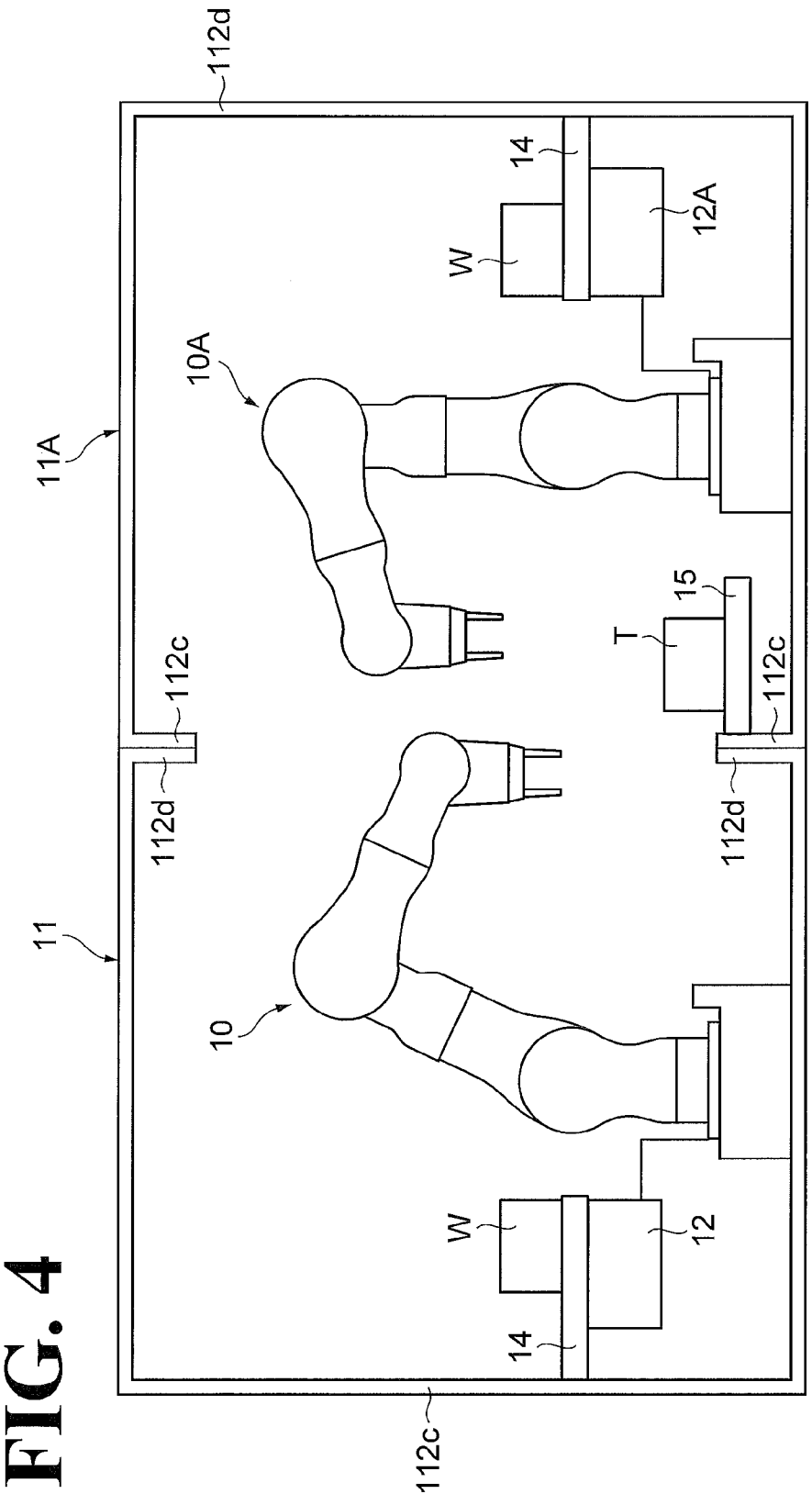
FIG. 4 is a front view of connected cells in which adjacent cells are connected to each other.

An image of the connected cells 11 and 11A will be described by referring to FIG. 4. FIG. 4 is a front view of the adjacent cells 11 and 11A connected to each other. The casters 111a and the stoppers 111b shown in FIG. 2 are not shown in FIG. 4. As shown in FIG. 4, the cell 11 accommodates the robot 10, the controller 12, and a workpiece W, while the cell 11A accommodates the robot 10A, the controller 12A, a workpiece W, and a tool T. The tool T is an additional part mounted to a robot. For example, the holding claws 104a mounted to the distal end of the hand 104 are one type of the tool T. The cell 11 and the cell 11A are connected to each other with the outer wall 112d of the cell 11 and the outer wall 112c of the cell 11A connected to each other.

As described above, the information indicating that the cells 11 and 11A are connected to each other is detected by the detection device 121 and input into the control device 122 and the communication device 123. The control device 122 opens the outer wall 112d of the cell 11 and the outer wall 112c of the cell 11A, as shown in FIG. 4. This ensures that the robots 10 and 10A share the work areas within the cells 11 and 11A; for example, the robot 10 accommodated in the cell 11 is able to use the tool T accommodated in the cell 11A.

The control device 122 sets a specific area S in which to control the operations of the robots 10 and 10A respectively accommodated in the connected cells 11 and 11A. Based on the specific area S, the control device 122 changes the operation command to avoid the interference between the robots 10 and 10A. The specific area S is an exclusive area E or a cooperative area C. The exclusive area E is where a particular robot among the robots 10 and 10A respectively corresponding to the connected cells 11 and 11A is allowed to work. The cooperative area C is sharable as a work area among the robots 10 and 10A respectively corresponding to the connected cells 11 and 11A. The control device 122 of the cell 11 may set the cell 11A part of the specific area S of the cells 11 and 11A. The control device 122 stores in advance the specific area S of each cell connectable to the cell 11 as specific area information. Upon receiving the information indicating connection of the cell 11 (including the information indicating the connected cell 11A) from the detection device 121, the control device 122 sets the specific area S based on the information indicating the connected cell 11A and the specific area information. It is possible to set the specific area S for each job of the robots 10 and 10A.

When the robot 10 in the cell 11 performs an operation that is against a rule of the specific area S after the control device 122 has set the specific area S, the control device 122 changes the operation command for the robot 10. Specifically, when the robot 10 performs an operation of entering the exclusive area E, where only the robot 10A in the cell 11A is allowed to operate, the control device 122 suspends the operation of the robot 10 or controls the robot 10 to withdraw from the exclusive area E, so as to avoid the interference between the robots 10 and 10A.

To determine whether the robot 10 has entered the exclusive area E, the control device 122 may, for example, set a virtual cube in the exclusive area E and determine whether a control point at the distal end of the hand 10 has entered the cube. It is also possible to mount a sensor to each of the robot arms 105 to 110 of the robot 10 and determine that the robot 10 has entered the exclusive area E when any of the sensors enters the exclusive area E.

Figure 5:
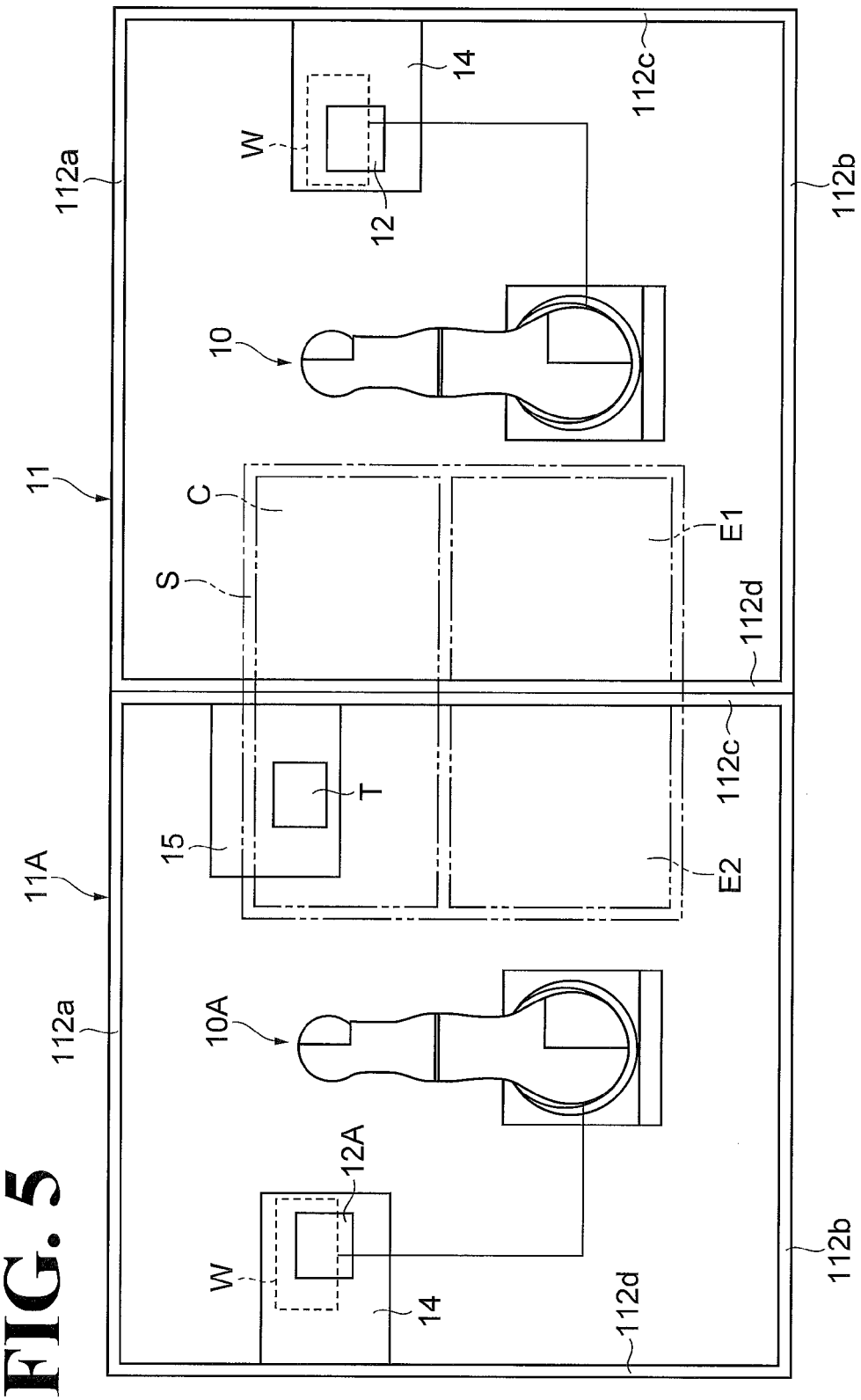
FIG. 5 is a plan view of the connected cells, schematically illustrating a specific area.

An image of how to set the specific area will be described by referring to FIG. 5. FIG. 5 is a plan view of the connected cells 11 and 11A, schematically illustrating the specific area S. The same cells 11 and 11A and the same components (such as the robots 10 and 10A) accommodated in the cells 11 and 11A are shown in FIGS. 4 and 5. As shown in FIG. 5, the specific area S is set across the cells 11 and 11A. Since the robots 10 and 10A need to share the tool T accommodated in the cell 11A, the cooperative area C is set as an area in the specific area S to which the robot 10 has an admission so as to use the tool T. An exclusive area E1 for the robot 10 is set as an area where only the robot 10 needs to enter to use the tool T, and an exclusive area E2 for the robot 10A is set as an area where only the robot 10A needs to enter to use the tool T. A virtual cube, for example, is set in the exclusive area E2, and the control device 122 determines whether a control point at the distal end of the robot 10 has entered the cube. When the control point has entered the cube, the control device 122 changes the operation command for the robot 10 to suspend the operation of the robot 10, or controls the robot 10 to withdraw from the exclusive area E2.

Figure 6:
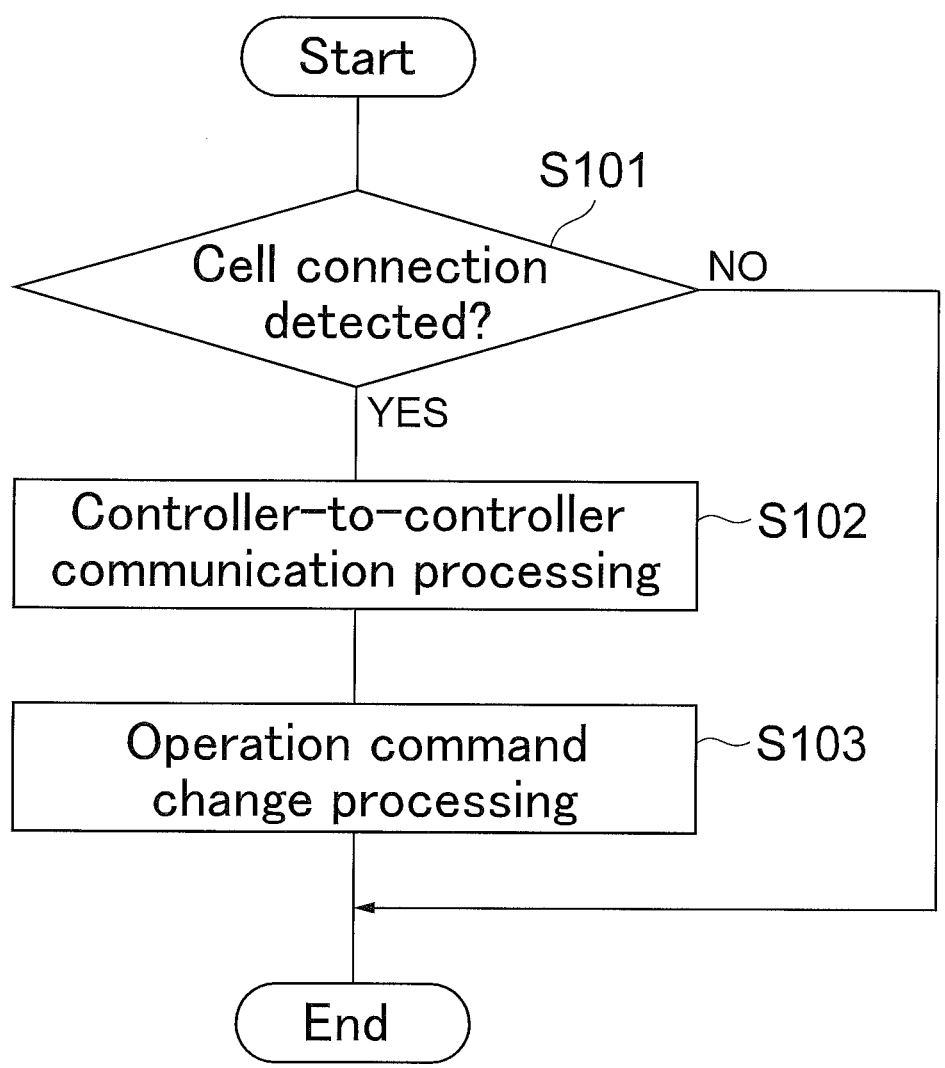
FIG. 6 is a flowchart of a procedure for operation command change processing associated with changing a work area of a robot.

Next, the operation change processing at the time of cell connection will be described by referring to FIG. 6. FIG. 6 is a flowchart of a procedure for the operation change processing for changing the work area of the robot. Each operation shown in FIG. 6 is described in association with the cells 11 and 11A and the components (such as the robots 10 and 10A) accommodated in the cells 11 and 11A shown in FIGS. 4 and 5. It is assumed that workpieces W have been already supplied to each of the cells 11 and 11A respectively accommodating the plurality of robots 10 and 10A to perform work on the workpieces W (supplying step).

First, the detection device 121 determines whether another cell is connected to the cell 11 (S101, detecting step), and detects that the cell 11A is connected to the cell 11. When at step S101 the detection device 121 determines that no cell is connected to the cell 11, the processing ends. Then, the controllers 12 and 12A (the communication devices 123 and 123A) of the connected cells 11 and 11A communicate with each other (step S102). Specifically, the communication device 123 notifies the communication device 123A of information on each job of the robot 10. The communication device 123A notifies the communication device 123 of information on whether the robots 10 and 10A will interfere with each other and information on each job of the robot 10A. The communication device 123 inputs into the control device 122 the information on whether the robots 10 and 10A will interfere with each other and the information on each job of the robots 10 and 10A.

Then, the control device 122 changes the operation commands for the robots 10 and 10A respectively accommodated in the connected cells 11 and 11A (S103, changing step). Specifically, when the control device 122 determines that the robots 10 and 10A will interfere with each other, the job of the robot 10 is suspended until the job of the robot 10A is complete, or the order of the jobs of the robot 10 is changed. When the control device 122 sets the specific area S and the robot 10 performs an operation that is against the rule of the specific area S, the operation command for the robot 10 is changed. Specifically, when the robot 10 performs an operation of entering the exclusive area E, where only the robot 10A in the cell 11A is allowed to work, the control device 122 suspends the operation of the robot 10, or controls the robot 10 to withdraw from the exclusive area E. After the operation command for the robot 10 has been changed, the workpieces W are subjected to a predetermined work by the robots 10 and 10A, and after the work, the workpieces W are taken out from the cells 11 and 11A (taking out step).

As has been described hereinbefore, in the robot system 1 according to this embodiment, when the detection device 121 detects that the plurality of cells 11 and 11A are connected to each other, the control device 122 changes the operation command for the robot 10 accommodated in the cell 11.

When a plurality of cells accommodating robots are connected to each other so that the robots share their work areas (cells) and thus work efficiently, it is necessary to change an operation command for at least one of the robots so as to avoid an interference between the robots. Conventionally, the operation command has been changed by an operator by performing the operation command change processing with respect to an upper device (PLC for example) common to a plurality of controllers, so as to avoid an interference between the robots. Performing the operation command change processing with respect to the upper device is significantly laborious for the operator.

In the robot system 1 according to this embodiment, the control device 122 is capable of automatic change of the operation command for the robot 10 in response to the detection device 121's detection of connection between cells 11 and 11A. This facilitates the operation command change processing, and significantly saves the operator the labor of management. Thus, a production line is quickly established. Additionally, saving the operator the labor of management reduces the cost of cell replacement.

The control device 122 sets the specific area S in which to control the operations of the robots 10 and 10A respectively accommodated in the connected cells 11 and 11A. Based on the specific area S, the control device 122 changes the operation command Thus, the robots 10 and 10A operate without interfering with each other and are not controlled unnecessarily in an area in which the robots 10 and 10A are able to cooperate. Specifically, the control device 122 sets the specific area S at the exclusive area E, where a particular robot among the robots 10 and 10A is allowed to work, or at the cooperative area C, which is sharable as a work area among the robots 10 and 10A. The control device 122 may change the operation command to synchronize the operations of the robots 10 and 10A. This further improves the efficiency of work effected by the cell connection.

The control device 122 has been described as changing the operation command for the robot 10 in response to the detection of the connection between the cells 11 and 11A by the detection device 121, based on the information on each job of the robot 10 and the robot 10A and based on the information on whether an interference will occur received from the communication device 123. The communication device 123, however, may not necessarily be included in the robot system. The communication device 123 is not required when, for example, the control device 122 stores in advance: each job of the robot 10 and another robot accommodated in a cell connectable to the cell 11; and information on whether the robot 10 and the other robot will interfere with each other.

In order to prevent the robot 10 from entering the exclusive area E, it is possible to provide a sensor along the exclusive area E to monitor the operation of the robot 10. The cooperative area C may be disposed along the body of the robot 10. The control device 122 may change the operation command by changing the order of commands for operating the robot 10. The control device 122 may be disposed in the PLC, which is an upper device. In this case, the PLC may change

What is claimed as new and desired to be secured by Letters Patent of the United States is:

1. A method for controlling a robot, the method comprising:
   detecting, by a detection device, connection between a plurality of cells respectively corresponding to a plurality of robots each configured to operate based on an operation command, each of the plurality of cells including a plurality of walls and a bottom surface that supports the robot and a work area in which each of the plurality of robots is configured to operate, the work area being located within a space of the cell defined by the plurality of walls and the bottom surface:
   connecting the plurality of cells to connect work areas and create a specific area that extends across the spaces of two adjacent cells;
   when the connection between the plurality of cells is detected, automatically changing at least one operation command among operation commands for the plurality of robots respectively accommodated in the connected cells based on a rule for the specific area; and
   controlling the plurality of robots in accordance with the at least one changed operation command.

2. The method according to claim 1, further comprising forming a sharable cooperative area within the plurality of cells which is accessible by the plurality of robots.

3. The method according to claim 1, further comprising detecting when outer walls of respective cells are brought into contact or are connected.

4. The method according to claim 3, further comprising opening one of the outer walls after detecting when the outer walls have been brought into contact or are connected.

5. A method comprising:
   supplying to-be-processed materials each to a corresponding one cell among a plurality of cells respectively corresponding to a plurality of robots each configured to operate based on an operation command, each of the plurality of cells including a plurality of walls and a bottom surface that supports the robot and a work area in which each of the plurality of robots is configured to operate, the work area being located within a space of the cell defined by the plurality of walls and the bottom surface;
   connecting work areas to create a specific area that extends across the spaces of two adjacent cells;
   detecting, by a detection device, connection between the plurality of cells;
   when the connection between the plurality of cells is detected in the detecting step, automatically changing at least one operation command among operation commands for the plurality of robots respectively accommodated in the connected cells based on a rule for the specific area;
   controlling the plurality of robots in accordance with the at least one changed operation command to perform work on the to-be-processed materials; and
   taking out the to-be-processed materials done with work performed by the plurality of robots from the work areas of the plurality of cells.

6. The method according to claim 5, further comprising forming a sharable cooperative area within the plurality of cells which is accessible by the plurality of robots.

7. The method according to claim 5, further comprising detecting when outer walls of respective cells are brought into contact or are connected.

8. The method according to claim 7, further comprising opening one of the outer walls after detecting when the outer walls have been brought into contact or are connected.

9. A robot system comprising:
   a plurality of robots each configured to operate based on respective operation commands;
   a plurality of cells respectively accommodating the plurality of robots and being connectable to each other, each of the plurality of cells including a plurality of walls and a bottom surface that supports the robot and a work area in which each of the plurality of robots is configured to operate, the work areas being located within a space of the cell defined by the plurality of walls and the bottom surface and connectable to create a specific area that extends across the space of two adjacent cells;
   a detection device configured to detect that the plurality of cells are connected to each other; and
   a changer device configured to, when the detection device detects that the plurality of cells are connected to each other, change at least one operation command among operation commands for the plurality of robots respectively accommodated in the connected cells based on a rule for the specific area.

10. The robot system according to claim 9, wherein the specific area comprises one area among an exclusive area and a cooperative area, the exclusive area being where one particular robot among the plurality of robots is allowed to operate, the cooperative area being sharable as a work area among the plurality of robots.

11. The robot system according to claim 10, wherein the changer device is configured to change the at least one operation command to synchronize the operations of the plurality of robots.

12. The robot system according to claim 9, wherein the changer device is configured to change the at least one operation command to synchronize the operations of the plurality of robots.

13. The robot system according to claim 9, wherein the changer device is configured to change the at least one operation command to synchronize the operations of the plurality of robots when the changer device determines that synchronous operation of the plurality of the robots increases efficiency of the plurality of robots.

14. The robot system according to claim 9, wherein the specific area includes a sharable cooperative area within the plurality of cells which is accessible by the plurality of robots.

15. The robot system according to claim 9, wherein the detection device comprises a sensor configured to detect when outer walls of respective cells are brought into contact or are connected.

16. The robot system according to claim 15, wherein the changer device is configured to open one of the outer walls when the detection device detects that the outer walls have been brought into contact or are connected.

* * * * *